(12) United States Patent
Colavin et al.

(10) Patent No.: US 7,840,761 B2
(45) Date of Patent: Nov. 23, 2010

(54) APPARATUS AND METHOD FOR SUPPORTING EXECUTION OF PREFETCH THREADS

(75) Inventors: Osvaldo M. Colavin, San Diego, CA (US); Davide Rizzo, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 353 days.

(21) Appl. No.: 11/096,475

(22) Filed: Apr. 1, 2005

(65) Prior Publication Data

US 2006/0224860 A1 Oct. 5, 2006

(51) Int. Cl.
*G06F 9/28* (2006.01)
*G06F 12/06* (2006.01)
(52) U.S. Cl. ............... 711/137; 711/213; 711/E12.004; 711/E12.057; 712/207; 712/E9.055
(58) Field of Classification Search ............ 711/137, 711/207
See application file for complete search history.

(56) References Cited

U.S. PATENT DOCUMENTS 6,134,633 A * 10/2000 Jacobs ................. 711/137
2002/0194354 A1* 12/2002 Bolduc et al. ............ 709/231
2004/0098552 A1* 5/2004 Kadi ..................... 711/169
2004/0215921 A1* 10/2004 Alexander et al. ........ 711/216

* cited by examiner

*Primary Examiner*—Reginald G Bragdon
*Assistant Examiner*—Eric Loonan
(74) *Attorney, Agent, or Firm*—Lisa K. Jorgenson; William A. Munck

(57) ABSTRACT

A processor executes one or more prefetch threads and one or more main computing threads. Each prefetch thread executes instructions ahead of a main computing thread to retrieve data for the main computing thread, such as data that the main computing thread may use in the immediate future. Data is retrieved for the prefetch thread and stored in a memory, such as data fetched from an external memory and stored in a buffer. A prefetch controller determines whether the memory is full. If the memory is full, a cache controller stalls at least one prefetch thread. The stall may continue until at least some of the data is transferred from the memory to a cache for use by at least one main computing thread. The stalled prefetch thread or threads are then reactivated.

20 Claims, 3 Drawing Sheets

APPARATUS AND METHOD FOR SUPPORTING EXECUTION OF PREFETCH THREADS

TECHNICAL FIELD

This disclosure is generally directed to processing systems and more specifically to an apparatus and method for supporting execution of prefetch threads.

BACKGROUND

Many different techniques have been developed to increase the speed at which processors execute instructions in a computing system. For example, a computing system may include multiple processors capable of executing instructions in parallel. As another example, a computing system may include one or multiple processors that are capable of executing instructions in multiple independent "threads."

A problem with conventional computing systems is that retrievals of data from external memory are often slower than the processing speed of the processors in the computing systems. If a conventional computing system waits until an instruction is executed to retrieve data for that instruction, the processor executing the instruction would typically wait or "stall" until the needed data is retrieved from the external memory. This delay or latency slows the execution of the instructions in the computing system, which decreases the performance of the system.

Conventional computing systems often prefetch data in an attempt to reduce this latency. Prefetching data typically involves a computing system attempting to identify the data that an instruction will require and then retrieving that data before the instruction is executed. However, prefetching data is routinely implemented for performance improvement only. Prefetching data often does not alter the functionality of a program being executed or the status of a processor executing the program.

SUMMARY

This disclosure provides an apparatus and method for supporting execution of prefetch threads.

In a first embodiment, a method includes retrieving data for a prefetch thread, where the prefetch thread executes instructions ahead of a main computing thread. The method also includes storing the data in a memory and determining whether the memory is full. In addition, the method includes stalling the prefetch thread based on a determination that the memory is full.

In a second embodiment, an apparatus includes a memory capable of storing data retrieved for a prefetch thread, where the prefetch thread executes instructions ahead of a main computing thread. The apparatus also includes at least one controller capable of determining whether the memory is full and stalling the prefetch thread based on a determination that the memory is full.

In a third embodiment, a system includes a processor capable of executing a main computing thread and a prefetch thread, where the prefetch thread executes instructions ahead of a main computing thread. The system also includes a first memory capable of storing data used by the main computing thread and the prefetch thread. The processor includes a memory system. The memory system includes a second memory capable of storing data retrieved from the first memory for the prefetch thread. The memory system also includes at least one controller capable of determining whether the second memory is full and stalling the prefetch thread based on a determination that the second memory is full.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION OF EXAMPLE EMBODIMENTS

Figure 1:
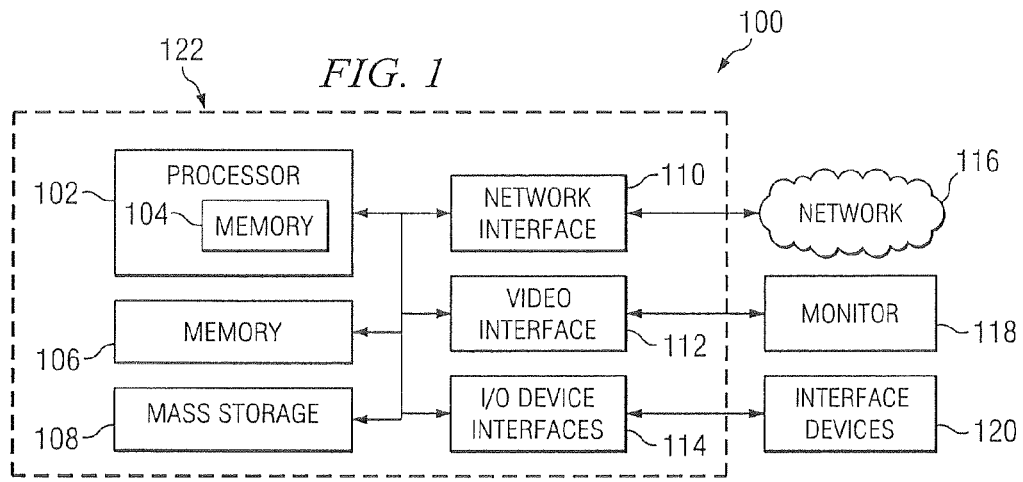
FIG. 1 illustrates an example processing system supporting execution of multiple threads according to one embodiment of this disclosure.

FIG. 1 illustrates an example processing system 100 supporting execution of multiple threads according to one embodiment of this disclosure. In particular, FIG. 1 illustrates an example processing system 100 supporting execution of prefetch threads used to prefetch data. The embodiment of the processing system 100 shown in FIG. 1 is for illustration only. Other embodiments of the processing system 100 may be used without departing from the scope of this disclosure.

In this example, the processing system 100 includes a processor 102. The processor 102 is capable of executing instructions. The instructions may represent any suitable instructions in any suitable instruction set. The processor 102 is also capable of executing multiple threads of a program or a group of programs. The processor 102 may therefore be referred to as a "multi-threaded processor." To support the execution of multiple threads, the processor 102 may include multiple sets of architectural structures, such as multiple sets of processor states and registers. The processor 102 represents any suitable structure capable of executing instructions. As a particular example, the processor 102 could represent a Simultaneous Multi-Threading ("SMT") processor. While FIG. 1 illustrates a single processor 102 in the processing system 100, the processing system 100 could include any number of processors 102.

In the illustrated embodiment, the processor 102 includes an internal memory 104. The memory 104 represents a storage for information used by the processor 102. For example, the memory 104 could represent a storage used to store instructions being executed by the processor 102 and data used by the processor 102 during execution of the instructions. As a particular example, the memory 104 could represent one or more caches in the processor 102. The memory 104 represents any suitable memory structure capable of storing and facilitating retrieval of information.

The processing system 100 also includes one or more memories external to the processor 102, such as a memory 106 and a mass storage device 108. The memory 106 represents a storage for storing information used, for example, by the processor 102. As particular examples, the memory 106 could represent a read-only memory ("ROM"), a programmable read-only memory ("PROM"), a random access memory ("RAM"), or any other or additional volatile or non-volatile storage and retrieval device or devices. The mass storage device 108 also represents a storage for storing information used, for example, by the processor 102. The mass storage device 108 may represent any storage device intended for longer-term storage of information, such as a hard disk drive, compact disc ("CD") drive, digital versatile disc ("DVD") drive, or any other or additional mass storage device or devices.

The processing system 100 further includes a network interface 110, a video interface 112, and one or more input/output ("I/O") device interfaces 114. These interfaces 110-114 facilitate communication between the processing system 100 and external components. For example, the network interface 110 allows the processing system 100 to transmit or receive information over a network 116. The video interface 112 allows the processing system 100 to transmit video information for display on a monitor 118. The I/O device interfaces 114 allow the processing system 100 to transmit or receive information to or from one or more interface devices 120.

The network interface 110 includes any hardware, software, firmware, or combination thereof for communicating over a network 116. The network 116 represents any suitable wireless or wired network, such as an Ethernet network, Internet Protocol ("IP") network, Asynchronous Transfer Mode ("ATM") network, or any other or additional network or networks. The video interface 112 includes any hardware, software, firmware, or combination thereof for presenting video information on a monitor 118. The I/O device interfaces 114 include any hardware, software, firmware, or combination thereof for supporting interaction with one or more interface devices 120. The interface devices 120 represent any suitable input/output devices, such as a keyboard, mouse, light pen, printer, scanner, or other or additional device or devices.

The various components in the processing system 100 communicate with one another using one or more buses 122. The buses 122 represent any suitable communication link or links capable of facilitating communication between at least some of the components in the processing system 100. The buses 122 may, for example, include a Peripheral Component Interconnect ("PCI") bus, a Universal Serial Bus ("USB"), or any other or additional bus or buses.

In one aspect of operation, the processor 102 executes instructions, and the instructions require data stored in a memory external to the processor 102. For example, the required data could be stored in the memory 106 or in the mass storage device 108. When this occurs, the processor 102 accesses the external memory, retrieves the required data, and stores the data in the internal memory 104. The time required to access and retrieve data from the external memory is often longer than the time required for the processor 102 to execute an instruction.

To help reduce the likelihood that the processor 102 stalls execution of instructions to wait for data to be retrieved from the external memory, the processor 102 prefetches data by "pre-executing" the instructions. For example, the processor 102 may execute multiple threads. One or more threads are responsible for executing instructions, such as the instructions contained in an application or other program being executed for a user. These threads are referred to as "main computing threads." One or more additional threads, called "prefetch threads," independently execute instructions ahead of the instructions being executed by the one or more main computing threads. These prefetch threads are capable of causing the processor 102 to initiate the retrieval of data from the external memory for storage in the internal memory 104 before that data is needed by the main computing threads. Each main computing thread may be associated with a single prefetch thread or with multiple prefetch threads.

Ideally, the retrieval of data initiated by a prefetch thread is complete and the data is stored in the internal memory 104 before that data is needed by a main computing thread. In this way, the required data may be available in the internal memory 104 at the time an instruction that needs this data is executed. As a result, the main computing thread executes an instruction that requires this data with less or no latency.

A synchronization mechanism is used to help ensure that a prefetch thread remains sufficiently ahead of a main computing thread during execution of the instructions. If the instructions executed by the prefetch thread and the main computing thread are too close, a data retrieval initiated by the prefetch thread may not be complete when the data is needed by the main computing thread. If the instructions executed by the prefetch thread and the main computing thread are too far apart, data retrieved by the prefetch thread may be stored in and then evicted from the internal memory 104 before the data is used by the main computing thread. As described in more detail below, a prefetch thread is stalled when too much data has been prefetched. This helps to reduce or eliminate the likelihood that prefetched data will be evicted from the internal memory 104 before use by a main computing thread.

The use of this synchronization mechanism may help to improve the performance of the processing system 100. For example, the processor 102 may be able to more efficiently execute instructions with fewer delays caused by retrieving data from external memory. Also, the synchronization mechanism may be transparent to a computer programmer, meaning that the programmer is not required to modify computer code to implement the synchronization mechanism. In addition, the synchronization mechanism may have low overhead, which helps to avoid overburdening the processing system 100.

Although FIG. 1 illustrates one example of a processing system 100 supporting execution of multiple threads, various changes may be made to FIG. 1. For example, the processing system 100 may include any other or additional components, and various components in FIG. 1 may be combined or omitted according to particular needs. Also, FIG. 1 illustrates one example environment in which prefetch threads may be used. Prefetch threads could be used in any other or additional processing environment without departing from the scope of this disclosure.

Figure 2:
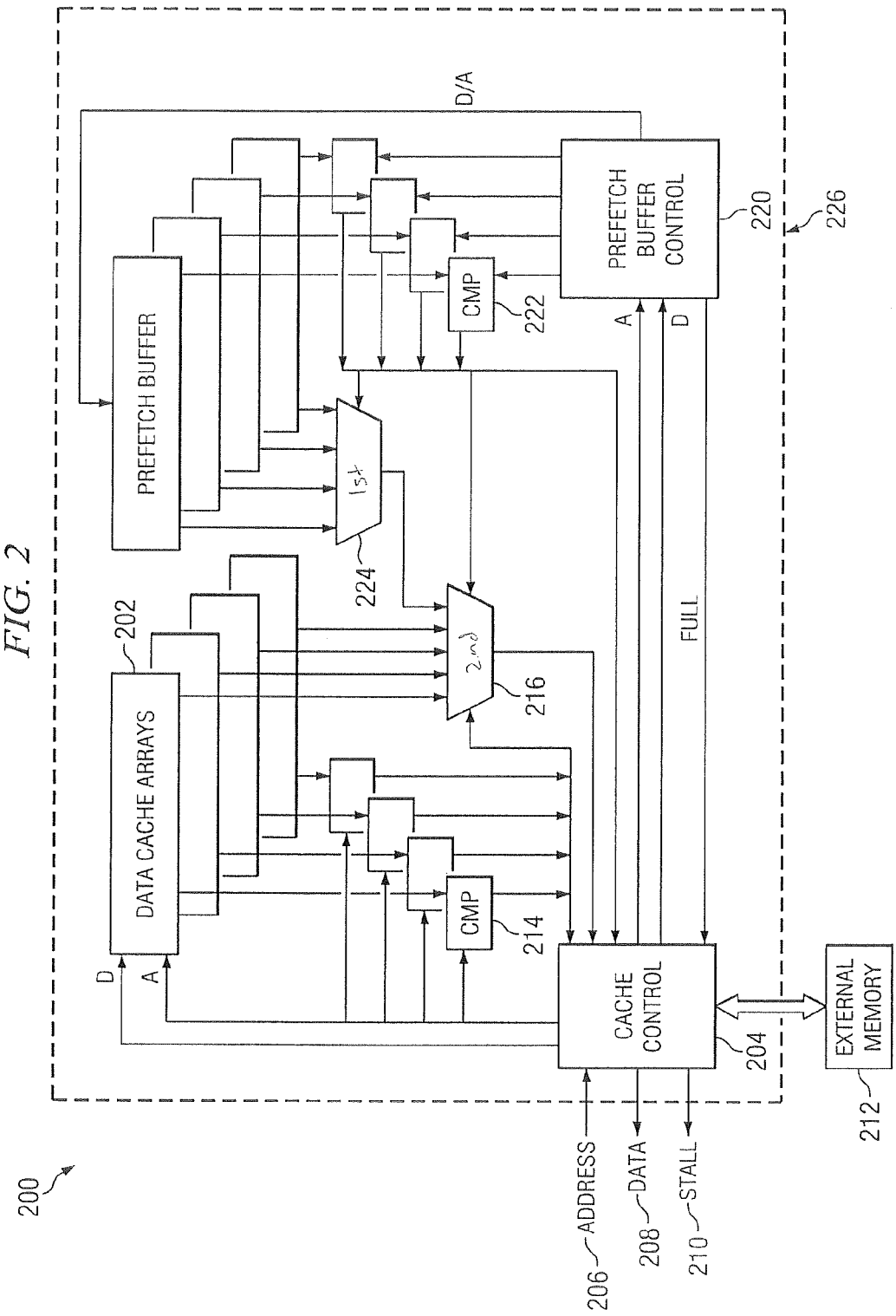
FIG. 2 illustrates an example memory system supporting execution of prefetch threads according to one embodiment of this disclosure.

FIG. 2 illustrates an example memory system 200 supporting execution of prefetch threads according to one embodiment of this disclosure. The embodiment of the memory system 200 shown in FIG. 2 is for illustration only. Other embodiments of the memory system 200 may be used without departing from the scope of this disclosure. Also, the memory system 200 is described as operating as the internal memory 104 in the processor 102 of FIG. 1. The memory system 200 could be used in any other apparatus or system without departing from the scope of this disclosure.

As shown in FIG. 2, the memory system 200 includes multiple data cache arrays 202. The data cache arrays 202 represent memory structures that form a data cache for storing and facilitating retrieval of data used by the processor 102. For example, the data cache arrays 202 could store data required by instructions being executed in one or more main computing threads and prefetch threads. The data cache arrays 202 could store any other information, such as tag portions of physical or virtual memory addresses associated with the data required by the instructions being executed.

Each data cache array 202 represents any suitable memory structure having any suitable storage capacity. For example, the data cache arrays 202 may form a four-way set associative data cache, where each data cache array 202 has a cache line size of 32 bytes. Also, the data cache arrays 202 may be accessed in any suitable manner, such as when the data cache arrays 202 are addressable by physical or virtual memory addresses.

A cache controller 204 is coupled to the data cache arrays 202. In this document, the term "couple" and its derivatives refer to any direct or indirect communication between two or more elements, whether or not those elements are in physical contact with one another. The cache controller 204 controls the storage of data in the data cache arrays 202 and the retrieval of data from the data cache arrays 202.

When data is needed by the processor 102, the processor 102 supplies a memory address 206 (such as a physical or virtual address) to the cache controller 204. The cache controller 204 determines if data associated with that address 206 has been stored in the data cache arrays 202. If so, a "cache hit" occurs, and the requested data is retrieved from the data cache arrays 202 and provided to the processor 102 as data 208. The processor 102 then executes an instruction in one of the threads that required the requested data.

If data associated with the address 206 is not stored in the data cache arrays 202, a "cache miss" occurs. As described in more detail below, if the requested data is not stored elsewhere in the memory system 200, the cache controller 204 communicates a stall signal 210 to the processor 102. The stall signal 210 causes the processor 102 to stall execution of the thread containing the instruction that needs the requested data. The cache controller 204 then retrieves the requested data (possibly along with additional data) from an external memory 212, stores the retrieved data in the appropriate data cache array 202, and provides the requested data to the processor 102 as data 208. The external memory 212 could, for example, represent the memory 106 or the mass storage device 108 of FIG. 1.

In some embodiments, the cache controller 204 retrieves data for instructions executed by both main computing threads (read or load operations) and prefetch threads (prefetch operations). In particular embodiments, data retrieved for main computing threads is stored in the data cache arrays 202 and at least part of the data is returned to the processor 102. Data retrieved for prefetch threads is stored elsewhere in the memory system 200, and the data is not provided to the processor 102 at that time. Also, in particular embodiments, the cache controller 204 asserts a stall signal 210 when an instruction executed by a main computing thread results in a cache miss. The cache controller 204 may or may not assert the stall signal 210 when an instruction executed by a prefetch thread results in a cache miss. The cache controller 204 includes any hardware, software, firmware, or combination thereof for controlling the use of data cache arrays 202.

The memory system 200 includes various components used to retrieve data associated with an address 206 from the data cache arrays 202. In this example, when data at an address 206 is requested, the cache controller 204 provides the address to the data cache arrays 202. The address is used as an index into the data cache arrays 202. In some embodiments, each data cache array 202 provides a tag from the indexed memory location to one of multiple comparators 214. Each data cache array 202 also provides data from the indexed memory location to a multiplexer 216.

The comparators 214 compare the address provided by the cache controller 204 to the tags from the data cache arrays 202. The tags identify at least a portion of the addresses of the data stored in the indexed memory locations in the data cache arrays 202. The comparators 214 generate outputs identifying the results of the comparisons. If a match is not found, the data associated with the address 206 is not present in the data cache arrays 202. If a match is found, the data associated with the address 206 is present in one of the data cache arrays 202. The multiplexer 216 uses the outputs of the comparators 214 to select the data from the appropriate data cache array 202. The multiplexer 216 provides the data to the cache controller 204, which provides the data to the processor 102.

Each of the comparators 214 includes any hardware, software, firmware, or combination thereof for comparing two or more values. The multiplexer 216 includes any hardware, software, firmware, or combination thereof for selecting one of multiple inputs for output.

The memory system 200 also includes various components used to prefetch data for storage in the memory system 200. In this example, prefetched data is stored in a prefetch buffer 218 that is separate from the data cache arrays 202. The prefetch buffer 218 represents a memory structure that stores and facilitates retrieval of prefetched data. For example, the prefetch buffer 218 could store data that is prefetched by instructions executed in one or multiple prefetch threads. The prefetch buffer 218 represents any suitable memory structure having any suitable storage capacity. As a particular example, the prefetch buffer 218 could represent a replicated set of banks containing multiple entries, where each entry stores an amount of data equal in size to one cache line of the data cache arrays 202.

When a prefetch thread needs data from the external memory 212, the cache controller 204 retrieves the requested data (and possibly additional data) and provides the address and the retrieved data to a prefetch buffer controller 220. The prefetch buffer controller 220 stores the retrieved data in the prefetch buffer 218. For example, the prefetch buffer 218 could include multiple entries, and the prefetch buffer controller 220 could store a specified amount of data (such as 32 bytes) in one of the entries. The prefetch buffer controller 220 could also store any other information in an entry, such as a tag associated with the data in that entry.

The prefetch buffer controller 220 may use any suitable technique to select the entry in which prefetched data is stored. For example, the prefetch buffer controller 220 could implement a circular counter. As a particular example, the counter may be incremented each time data is stored in the prefetch buffer 218 until the counter hits a maximum value equal to the number of entries in the prefetch buffer 218. At that point, the counter is reset to a minimum value. In this example, the prefetch buffer controller 220 implements a first-in, first-out policy to manage the prefetch buffer 218.

The prefetch buffer controller 220 also facilitates the transfer of data stored in the prefetch buffer 218 to the data cache arrays 202 and the processor 102. As described in more detail below, the prefetch buffer controller 220 further stalls prefetch threads when necessary to prevent too much data from being prefetched and stored in the prefetch buffer 218. When the cache controller 204 receives a request for data at an address 206 from a main computing thread, the cache controller 204 provides the address to the prefetch buffer controller 220. The prefetch buffer controller 220 then provides the address to multiple comparators 222, and each comparator 222 receives the tag from one entry in the prefetch buffer 218. Each entry in the prefetch buffer 218 also provides the data in that entry to a multiplexer 224. The comparators 222 compare the address provided by the prefetch buffer controller 220 to the tags from the prefetch buffer 218 and generate outputs identifying the results of the comparisons. If a match is not found, data associated with the address 206 is not present in the prefetch buffer 218, and the cache controller 204 asserts the stall signal 210 and retrieves the data from the external memory 212.

If a match is found, data associated with the address 206 is present in one of the entries in the prefetch buffer 218. The multiplexer 224 uses the outputs of the comparators 222 to select the data from the appropriate entry in the prefetch buffer 218. The multiplexer 224 then provides the data to the multiplexer 216, which uses the outputs of the comparators 222 to select and output the data from the multiplexer 224 to the cache controller 204. In some embodiments, all of the data from the entry in the prefetch buffer 218 is provided to the cache controller 204, which stores the data in a cache line in one of the data cache arrays 202. This frees that entry in the prefetch buffer 218 to store more prefetched data.

To help ensure that a prefetch thread remains ahead but not too far ahead of a main computing thread, the prefetch buffer controller 220 is capable of asserting a full signal 226 when the prefetch buffer 218 is full. In this example, the prefetch buffer 218 is full when all entries are occupied by valid data and none of the data has been transferred to the data cache arrays 202. The cache controller 204 uses the full signal 226 to stall a prefetch thread.

After at least one entry in the prefetch buffer 218 has been retrieved and transferred to the data cache arrays 202, the prefetch buffer 218 is no longer full. The prefetch buffer controller 220 de-asserts the full signal 226, the cache controller 204 stops stalling the prefetch thread, and the prefetch thread resumes execution. The prefetch thread may then attempt to prefetch additional data, and the prefetched data is stored in the prefetch buffer 218. The prefetch buffer controller 220 again may stall the prefetch thread if and when the prefetch buffer 218 becomes full.

In this manner, the prefetch buffer controller 220 helps to ensure that the prefetch thread is not attempting to prefetch too much data. Without the use of the full signal 226, the prefetch thread might prefetch too much data, which could cause data in the prefetch buffer 218 to be overwritten or "evicted." If the evicted data is later needed by a main computing thread, the cache controller 204 would be unable to retrieve the data from the prefetch buffer 218. This requires the cache controller 204 to stall the main computing thread and fetch the same data from the external memory 212 again.

By using the full signal 226, the prefetch buffer controller 220 may ensure that prefetched data stored in the prefetch buffer 218 is kept until needed by a main computing thread. This helps to improve the performance of the memory system 200 by reducing redundant fetches to the same address in the external memory 212. In effect, the instructions executed by the prefetch thread represent "non-blocking" instructions as long as the prefetch buffer 218 is not full. When the prefetch buffer 218 is full, the instructions executed by the prefetch thread represent "blocking" instructions that may stall execution of the prefetch thread.

In some embodiments, this technique works well if a prefetch thread has high precision and accuracy, meaning that the prefetch thread precisely and accurately identifies the memory addresses to be accessed by the main computing thread. A worst case scenario might occur if the prefetch buffer 218 is filled with data that is never accessed by the main computing thread. In this case, the data in the prefetch buffer 218 may never be transferred to the data cache arrays 202, and the prefetch thread may never resume execution. However, the worst case scenario may be rarely encountered when targeting specific application domains where prefetch precision can be high because of the intrinsic nature of the code forming the main computing thread (such as code implementing simple control flow and predictable or regular address generation).

Various actions may occur if the worst case scenario or similar scenario is encountered. In some embodiments, nothing is done when these situations arise, and the prefetch thread does not resume execution. This is equivalent (from the memory access perspective) to executing the main computing thread without a prefetch thread. In other embodiments, the prefetch buffer controller 220 or cache controller 204 may implement a mechanism to force reactivation of a prefetch thread, such as a timer that forces the prefetch buffer controller 220 to overwrite an entry in the prefetch buffer 218 when the timer expires.

The prefetch buffer controller 220 may use any suitable technique to assert and de-assert the full signal 226. For example, the prefetch buffer controller 220 may be capable of tracking the number of valid entries stored in the prefetch buffer 218. As a particular example, the prefetch buffer controller 220 could track the difference between the number of reads from the prefetch buffer 218 (such as the number of transfers to the data cache arrays 202) and the number of writes to the prefetch buffer 218. If the number of writes exceeds the number of reads by an amount equal to the number of entries in the prefetch buffer 218, the prefetch buffer 218 is full.

While the use of a full signal 226 has been described, a similar technique could be used to generate a "space available" or "not full" signal instead of or in addition to the full signal 226. The prefetch buffer controller 220 could assert a space available signal whenever at least one entry in the prefetch buffer 218 is available. The prefetch buffer controller 220 could de-assert the space available signal whenever the prefetch buffer 218 is full, causing the cache controller 204 to stall a prefetch thread.

The prefetch buffer controller 220 includes any hardware, software, firmware, or combination thereof for controlling the use of the prefetch buffer 218. Each of the comparators 222 includes any hardware, software, firmware, or combination thereof for comparing two or more values. The multiplexer 224 includes any hardware, software, firmware, or combination thereof for selecting one of multiple inputs for output.

The cache controller 204 may use any suitable technique to distinguish between requests for data from a main computing thread and requests for data from a prefetch thread. For example, requests for data could include an indicator identifying whether or not the data is being prefetched. This indicator is used to determine whether data retrieved from the external memory 212 should be stored in the data cache arrays 202 (data is not being prefetched) and returned to the processor 102 (for a load or read operation) or the prefetch buffer 218 (data is being prefetched for a prefetch operation).

Although FIG. 2 illustrates one example of a memory system 200 supporting execution of prefetch threads, various changes may be made to FIG. 2. For example, the memory system 200 shown in FIG. 2 has been simplified for ease of illustration and explanation. In particular, components used to execute store instructions to store data in the data cache arrays 202 and the external memory 212 have been omitted. The memory system 200 could include these components without departing from the scope of this disclosure. Also, the memory system 200 may include any other or additional components, and various components in FIG. 2 may be combined or omitted according to particular needs. As specific examples, the controllers 204, 220 could be combined, and the data cache arrays 202 and the prefetch buffer 218 could be combined into a single memory structure. In addition, the various components shown in FIG. 2 are for illustration only. The prefetch thread stalling technique may be used with any other memory arrangement.

Figure 3:
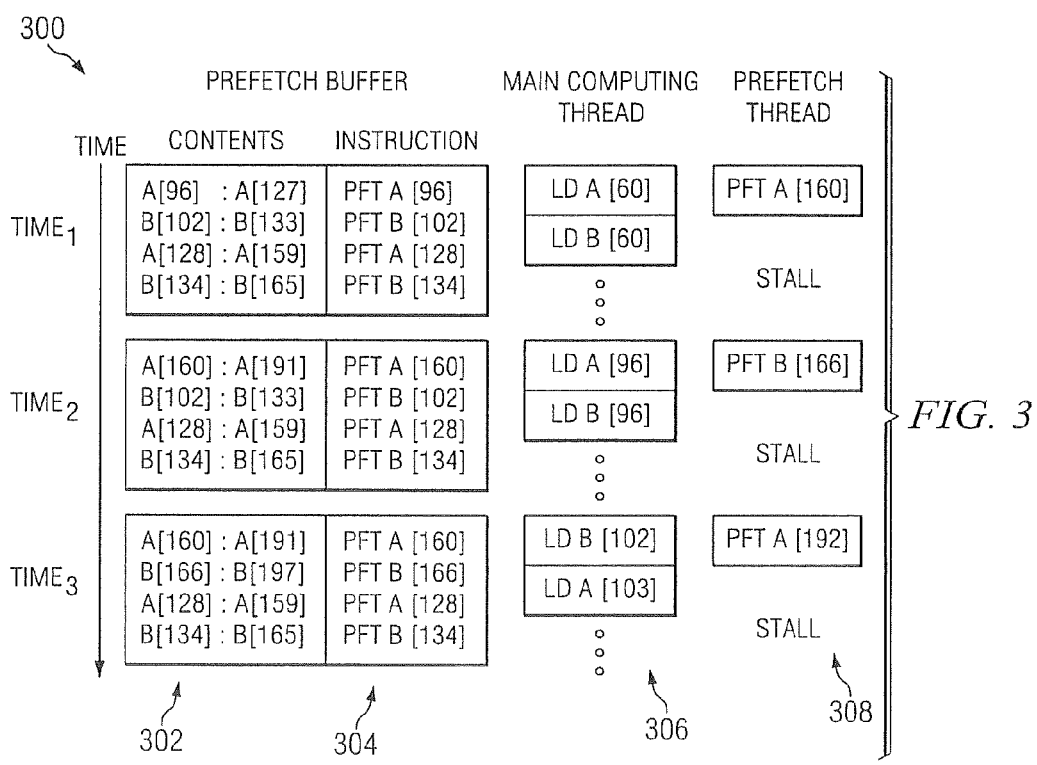
FIG. 3 illustrates an example operation of a memory system for supporting execution of prefetch threads according to one embodiment of this disclosure.

FIG. 3 illustrates an example operation 300 of a memory system for supporting execution of prefetch threads according to one embodiment of this disclosure. While FIG. 3 is described with respect to the memory system 200 of FIG. 2, the operation 300 shown in FIG. 3 could be performed by any other suitable system. Also, the operation 300 shown in FIG. 3 is for illustration only. The memory system 200 may operate in any other suitable manner without departing from the scope of this disclosure.

The operation 300 shown in FIG. 3 represents a test case illustrating how a prefetch thread may be stalled to ensure that prefetched data is provided to a main computing thread for use before being evicted from a prefetch buffer 218. The operation 300 is based on a main computing thread executing the following code having memory accesses:

short c[ ]
byte a[ ], b[ ]
for (i=0; i<max; i++)
   c[i+1]=a[i]+b[i]

The loop executes for a number of iterations and requires memory access to read data (load a, load b) and to write results (store c). This test case illustrates the behaviors of a prefetch thread that could lead to performance loss in more complex codes.

Assume that the data cache arrays 202 have a cache line size of 32 bytes and that arrays a[ ] and b[ ] are four-byte aligned. Without the use of a prefetch thread, data values for a[ ] and b[ ] are retrieved from the external memory 212 and stored in the data cache arrays 202 in 32-byte groups. The following represents a trace of possible memory accesses during execution of the code, where bold accesses represent possible cache misses:

|  |
| --- |
| load a[0] |
| load a[1] |
| ... |
| load a[30] |
| load a[31] |
| load a[32] |
| load a[33] |
| ... |
| load a[63] |
| load a[64] |
| load a[65] |
| ... |
| load a[95] |
| load a[96] |
| load a[97] |
| ... |
| load a[127] |
| load a[128] |
| load a[129] |
| ... |
| ... |
| load b[5] |
| load b[6] |
| load b[7] |
| ... |
| load b[37] |
| load b[38] |
| load b[39] |
| ... |

| -continued |
| --- |
| load b[69] |
| load b[70] |
| load b[71] |
| ... |
| load b[101] |
| load b[102] |
| load b[103] |
| ... |

The stalls shown above may have a great impact on the performance of the processing system 100. It is possible that this impact could result in the processing system 100 spending more clock cycles in a stalled state than actually executing useful operations.

As discussed above, a prefetch thread may be used to prefetch data into the prefetch buffer 218. This may help to reduce the number of stalls and increase the performance of the processing system 100. For the sample code shown above, a prefetch thread could be generated by the processing system 100 that executes the following prefetch code:

short c[ ]
byte a[ ], b[ ]
for (i=PD*CL; i<max; i+=CL)
{
  prefetch a[i];
  prefetch b[i];
} where PD represents a prefetch distance (the number of cache lines that the prefetch thread tries to prefetch ahead of the main computing thread) and CL represents the cache line size of the data cache arrays 202. Techniques and algorithms for generating prefetch threads are generally available.

If the prefetch buffer controller 220 could not stall a prefetch thread using the full signal 226, the prefetch thread may prefetch too much data. This may cause the premature eviction of previously prefetched data from the prefetch buffer 218. This can be demonstrated in FIG. 3, which illustrates the contents 302 of the prefetch buffer 218 and the prefetch thread instructions 304 that resulted in those contents 302. FIG. 3 also illustrates the instructions 306 executed by a main computing thread and the instructions 308 executed by a prefetch thread. In addition, FIG. 3 illustrates how the contents 302 and instructions 304-308 vary over time.

As shown in FIG. 3, at time $TIME_1$, the first entry in the prefetch buffer 218 contains the data values a[96]-a[127], and these contents 302 were prefetched in response to a "prefetch a[96]" instruction 304. Similarly, the second entry in the prefetch buffer 218 contains the data values b[102]-b[133], and these contents 302 were prefetched in response to a "prefetch b[102]" instruction 304.

At time $TIME_1$, the instruction 308 to be executed by the prefetch thread would prefetch a sequence of data values starting at a[160]. If the instruction 308 was executed, the first entry in the prefetch buffer 218 (containing the oldest data) would be evicted. However, the data values a[96]-a[127] in the first entry have not yet been used by the main computing thread. The instruction 306 being executed by the main computing thread is only attempting to load the data value a[60]. In other words, the main computing thread has not yet reached the point where the data values a[96]-a[127] in the first entry of the prefetch buffer 218 are needed. As a result, executing the "prefetch a[160]" instruction 308 would evict data from the first entry that is needed in the future by the main computing thread.

The prefetch buffer controller 220 resolves this problem by stalling the prefetch thread when the prefetch buffer 218 is full. In this example, the prefetch buffer 218 is full after the "prefetch b[134]" instruction 304 is executed. At this point, all of the entries in the prefetch buffer 218 contain valid data, and none of the data has been retrieved for the main computing thread. As a result, prefetch buffer controller 220 asserts the full signal 226, causing the cache controller 204 to assert the stall signal 210 that causes the processor 102 to stall the prefetch thread. While the prefetch thread is stalled, the main computing thread continues to execute.

At time $TIME_2$, the main computing thread requests the data values a[96] and b[96]. The request for the data value a[96] causes the data in the first entry in the prefetch buffer 218 to be transferred to the cache controller 204, which stores the data in a cache line of a data cache array 202. At this point, the prefetch buffer 218 is no longer full, and the prefetch buffer controller 220 de-asserts the full signal 226. The cache controller 204 stops stalling the prefetch thread, which then executes the "prefetch a[160]" instruction 308. This causes the data values a[160]-a[191] to be stored in the first entry of the prefetch buffer 218.

The execution of the "prefetch a[160]1" instruction 308 again causes the prefetch buffer 218 to be full. As a result, the prefetch buffer controller 220 asserts the full signal 226 and causes the cache controller 204 to stall the prefetch thread. Because of this, the prefetch thread does not execute the "prefetch b[166]" instruction 308.

At time $TIME_3$, the main computing thread requests the data value b[102]. The request for the data value b[102] causes the data in the second entry of the prefetch buffer 218 to be transferred to the cache controller 204 for storage in a cache line of a data cache array 202. At this point, the prefetch buffer 218 is no longer full, the full signal 226 is de-asserted, and the prefetch thread is resumed. The prefetch thread executes the "prefetch b[166]" instruction 308, which fills the prefetch buffer 218. The prefetch buffer controller 220 stalls execution of the "prefetch a[192]" instruction 308 in the prefetch thread by asserting the full signal 226. This process may continue as long as the prefetch thread is being executing.

As shown in FIG. 3, the prefetch buffer controller 220 helps to ensure that the prefetch thread does not execute instructions too far ahead of the main computing thread. As a result, data prefetched by the prefetch thread is more often available in the prefetch buffer 218 when needed by the main computing thread. This helps to reduce the number of accesses to the external memory 212 and increase the performance of the memory system 200. In addition, this results in automatic synchronization between the threads and does not require modifications to the code being executed by the main computing thread.

As noted above, techniques and algorithms for generating prefetch threads are generally available. For example, program slicing based on source code analysis may be used, and this technique allows integration into a normal compilation flow. Program slicing typically concentrates on the relevant instructions leading to memory references that generate cache misses, such as address computations and conditions related to the control flow of an application or other program. By focusing on subsets of a main computing thread (such as focusing on a few specific loops), program slicing complexity may be reduced, leading to increased prediction accuracy of the pre-executed code and the set of generated prefetch operations. This may be useful in certain application fields such as embedded multimedia for audio or video processing, where a few small loops are often responsible for most of the execution cycles of the overall application (and therefore also for the cache misses).

Although FIG. 3 illustrates one example of the operation 300 of a memory system for supporting execution of prefetch threads, various changes may be made to FIG. 3. For example, the operation 300 shown in FIG. 3 is for illustration only. Also, while FIG. 3 illustrates the use of four 32-byte entries in the prefetch buffer 218, any number of prefetch buffer entries and any size of prefetch buffer entries may be used. Further, while FIG. 3 illustrates the use of one prefetch thread associated with one main computing thread, the same techniques may be used with multiple prefetch threads or multiple main computing threads. In addition, any suitable technique may be used to assert and de-assert the full signal 226, and any other or additional signal(s) may be used in place of the full signal 226 (such as a "space available" signal).

Figure 4:
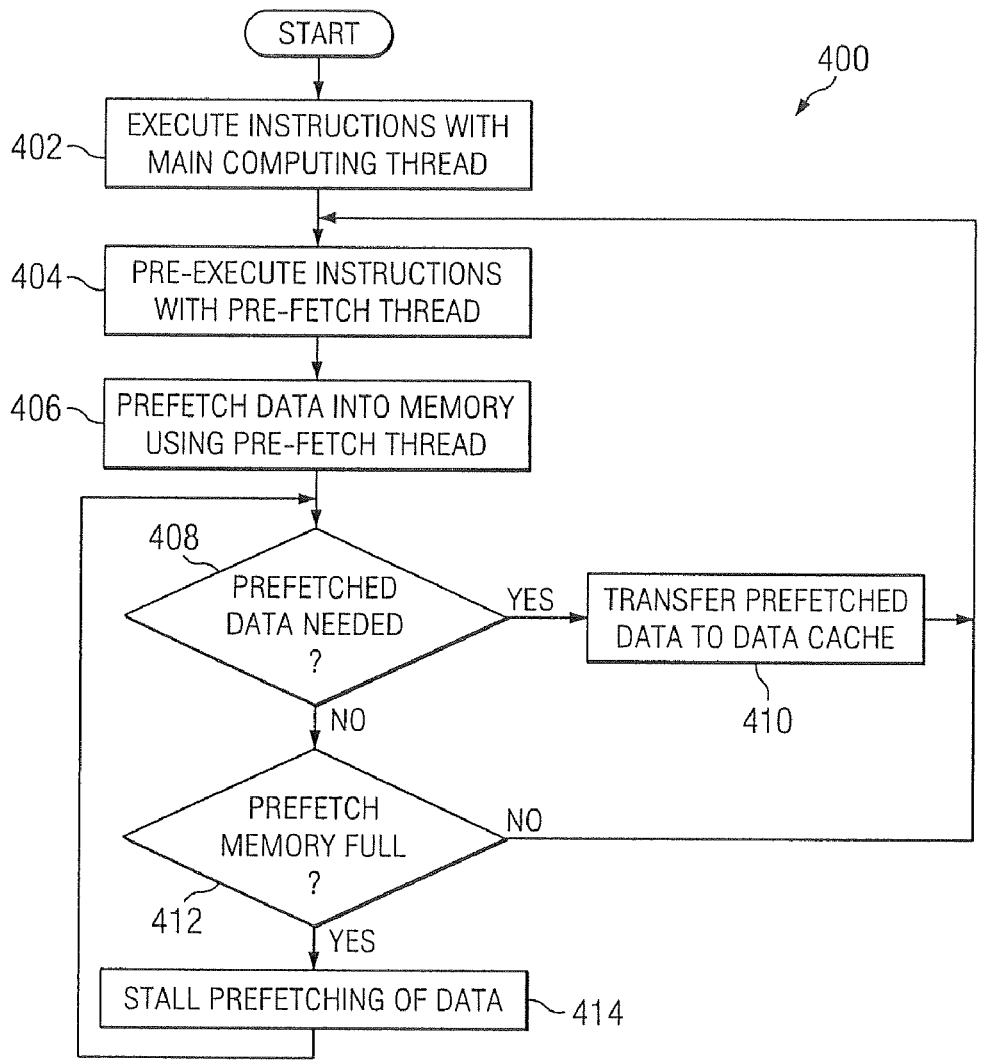
FIG. 4 illustrates an example method for supporting execution of prefetch threads according to one embodiment of this disclosure.

FIG. 4 illustrates an example method 400 for supporting execution of prefetch threads according to one embodiment of this disclosure. For ease of explanation, the method 400 is described with respect to the processing system 100 of FIG. 1 using the memory system 200 of FIG. 2. The method 400 could be used in any other system.

The processing system 100 executes instructions with at least one main computing thread at step 402. This may include, for example, the processor 102 in the processing system 100 executing instructions for the main computing thread. This may also include the main computing thread requesting retrieval of data for use with the instructions.

The processing system 100 also pre-executes one or more instructions with at least one prefetch thread at step 404. This may include, for example, the processor 102 in the processing system 100 executing instructions for the prefetch thread, where the instructions executed for the prefetch thread are further along in order than the instructions executed by the main computing thread. This may also include the prefetch thread requesting retrieval of data for use with the instructions.

The processing system 100 prefetches data into a prefetch memory using the prefetch thread at step 406. This may include, for example, the processor 102 requesting that the memory system 200 retrieve data from a specified address requested by the prefetch thread. This may also include the memory system 200 retrieving a quantity of data from an external memory 212 and storing the data in an entry in the prefetch buffer 218.

The processing system 100 determines if the prefetched data is needed at step 408. This may include, for example, the cache controller 204 receiving a request for data that is stored in the prefetch buffer 218. If requested data is stored in the prefetch memory, the prefetched data is transferred to a data cache at step 410. This may include, for example, the prefetch buffer 218 providing data from the entry containing the requested data to the cache controller 204 through the multiplexers 224, 216. This may also include the cache controller 204 storing the data in a data cache array 202. At this point, the processing system 200 returns to step 404 to execute additional instructions for the prefetch thread. If the prefetch thread was being stalled when the data is transferred out of the prefetch buffer 218, this may further include reactivating the prefetch thread now that space is available in the prefetch buffer 218.

If prefetched data is not needed at step 408, the processing system 100 determines if the prefetch memory is full at step 412. This may include, for example, the prefetch buffer controller 220 determining whether all entries in the prefetch buffer 218 contain valid data.

If the prefetch memory is full, the processing system 100 stalls the prefetching of data at step 414. This may include, for example, the prefetch buffer controller 220 asserting a full signal 226. This may also include the cache controller 204 detecting the full signal 226 and communicating a stall signal 210 to the processor 102. The stall signal 210 causes the processor 102 to stall the prefetch thread. The processing system 100 then returns to step 408 to wait for prefetched data to be retrieved and used by the main computing thread. If the prefetch memory is not full, the processing system 200 returns to step 404 to execute additional instructions for the prefetch thread.

These various steps shown in FIG. 4 may be repeated as many times as necessary during execution of the prefetch thread or the main computing thread. The method 400 may end at any suitable time, such as upon completion of the main computing thread.

Although FIG. 4 illustrates one example of a method 400 for supporting execution of prefetch threads, various changes may be made to FIG. 4. For example, while FIG. 4 illustrates the steps as being performed serially, various steps could be performed in parallel. As a specific example, step 402 could be performed in parallel with steps 404-414. Also, steps 408-410 could operate in parallel with steps 412-414.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of supporting execution of a prefetch thread within a processor, the method comprising:

executing instructions with a main computing thread within a processor, including (1) retrieving data for the main computing thread, and (2) storing the data retrieved for the main computing thread within a data cache internal to the processor;

pre-executing the instructions with a prefetch thread within the processor, the prefetch thread executing the instructions ahead of the main computing thread, wherein pre-executing the instructions includes (1) retrieving data for the prefetch thread, and (2) storing the data retrieved for the prefetch thread in a prefetch buffer internal to the processor;

based on a memory address associated with data required by one of the instructions being executed with the main computing thread, evicting the data from the prefetch buffer;

determining whether the prefetch buffer is full;

stalling the prefetch thread based on a determination that the prefetch buffer is full;

transferring data from the prefetch buffer to the data cache for use by the main computing thread after stalling the prefetch thread; and reactivating the prefetch thread.

2. The method of claim 1, wherein the prefetch buffer comprises a plurality of entries.

3. The method of claim 2, wherein:

storing the data retrieved for the prefetch thread comprises filling each of the entries in the prefetch buffer with the data; and transferring data comprises transferring the data in at least one of the entries to the data cache.

4. The method of claim 3, wherein determining whether the prefetch buffer is full comprises:

identifying a difference between a number of operations that store the data in the entries and a number of operations that transfer at least some of the data to the data cache;

comparing the difference to a number of entries in the prefetch buffer; and determining that the prefetch buffer is full when the difference equals the number of entries in the prefetch buffer.

5. The method of claim 4, wherein:

stalling the prefetch thread comprises asserting a full signal when the prefetch buffer is full; and reactivating the prefetch thread comprises de-asserting a full signal when the prefetch buffer is not full.

6. The method of claim 3, wherein transferring the data from the prefetch buffer to the data cache comprises:

comparing a tag from each of the entries in the prefetch buffer to an address associated with the main computing thread; and transferring the data in one of the entries to the data cache when the tag from that entry matches the address.

7. The method of claim 3, wherein transferring the data from the prefetch buffer to the data cache comprises transferring the data from one of the entries in the prefetch buffer to the data cache after determining that the data cache does not contain requested data that is needed by the main computing thread.

8. The method of claim 2, wherein:

the data cache comprises a plurality of data cache arrays;

retrieving the data for the prefetch thread comprises fetching the data from an external memory;

the prefetch thread comprises one or more prefetch threads; and the main computing thread comprises one or more main computing threads.

9. A processor for executing instructions with a main computing thread and pre-executing the instructions with a prefetch thread, the processor comprising:

a memory comprising a prefetch buffer and a data cache;

at least one controller configured to:

execute instructions with the main computing thread, including (1) retrieving data for the main computing thread, and (2) storing the data retrieved for the main computing thread within the data cache;

pre-execute the instructions with the prefetch thread ahead of the main computing thread, including (1)

retrieving data for the prefetch thread, and (2) storing the data retrieved for the prefetch thread in the prefetch buffer;

based on a memory address associated with data required by one of the instructions being executed with the main computing thread, evicting the data from the prefetch buffer;

determining whether the prefetch buffer is full;

stalling the prefetch thread based on a determination that the prefetch buffer is full;

transferring data from the prefetch buffer to the data cache for use by the main computing thread after stalling the prefetch thread; and reactivating the prefetch thread.

10. The processor of claim 9, wherein the prefetch buffer comprises a plurality of entries.

11. The processor of claim 10, wherein the at least one controller comprises:

a prefetch controller capable of determining whether the prefetch buffer is full; and a cache controller capable of stalling the prefetch thread based on the determination that the prefetch buffer is full.

12. The processor of claim 11, wherein:

the prefetch controller is capable of providing an indication that the prefetch buffer is full and an indication that the prefetch buffer is not full; and the cache controller is capable of stalling the prefetch thread based on the indication that the prefetch buffer is full and reactivating the prefetch thread based on the indication that the prefetch buffer is not full.

13. The processor of claim 10, wherein the processor further comprises:

a first plurality of comparators each capable of comparing a tag from each of the entries in the prefetch buffer to an address associated with the main computing thread.

14. The processor of claim 13, wherein:

the data cache comprises a plurality of data cache arrays; and the processor further comprises:

a second plurality of comparators each capable of comparing a tag from one of the data cache arrays to the address associated with the main computing thread.

15. The processor of claim 9, wherein:

the at least one controller is capable of retrieving the data for the prefetch thread by fetching the data from an external memory that is external to the processor;

the prefetch thread comprises one or more prefetch threads; and the main computing thread comprises one or more main computing threads.

16. A system, comprising:

a processor capable of executing instructions with a main computing thread and pre-executing the instructions with a prefetch thread, the prefetch thread executing the instructions ahead of a main computing thread, the processor comprising an internal memory system and at least one controller, wherein the internal memory system comprises a prefetch buffer and a data cache, and wherein the at least one controller is configured to:

execute instructions with the main computing thread, including (1) retrieving data for the main computing thread, and (2) storing the data retrieved for the main computing thread within the data cache;

pre-execute the instructions with the prefetch thread ahead of the main computing thread, including (1) retrieve data for the prefetch thread and (2) store the data retrieved for the prefetch thread in the prefetch buffer;

based on a memory address associated with data required by one of the instructions being executed with the main computing thread, evicting the data from the prefetch buffer;

determine whether the prefetch buffer is full;

stall the prefetch thread based on a determination that the prefetch buffer is full;

transfer data from the prefetch buffer to the data cache for use by the main computing thread after stalling the prefetch thread; and reactivate the prefetch thread.

17. The system of claim 16, wherein the prefetch buffer comprises a plurality of entries.

18. The system of claim 17, wherein:

the at least one controller comprises a cache controller and a prefetch controller;

the prefetch controller is capable of providing an indication that the prefetch buffer is full and an indication that the prefetch buffer is not full; and the cache controller is capable of stalling the prefetch thread based on the indication that the prefetch buffer is full and reactivating the prefetch thread based on the indication that the prefetch buffer is not full.

19. The system of claim 18, wherein:

the cache controller is capable of stalling the prefetch thread by asserting a stall signal, the processor capable of stalling the prefetch thread in response to the asserted stall signal; and the cache controller is capable of reactivating the prefetch thread by de-asserting the stall signal, the processor capable of reactivating the prefetch thread in response to the de-asserted stall signal.

20. The system of claim 17, wherein:

the data cache comprises a plurality of data cache arrays; and the internal memory system further comprises:

a first plurality of comparators each capable of comparing a tag from one of the entries in the prefetch buffer to an address associated with the main computing thread;

a second plurality of comparators each capable of comparing a tag from one of the data cache arrays to the address associated with the main computing thread;

a first multiplexer configured to receive data from the prefetch buffer; and a second multiplexer configured to receive data from the data cache and data output by the first multiplexer, the second multiplexer further configured to output one of: the data from the data cache and the data output by the first multiplexer.

* * * * *